(12) United States Patent
Andou

(10) Patent No.: US 6,223,887 B1
(45) Date of Patent: May 1, 2001

(54) DEVICE FOR TRANSFERRING PRODUCTS

(75) Inventor: Naoyuki Andou, Komaki (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 09/196,820

(22) Filed: Nov. 20, 1998

(30) Foreign Application Priority Data

Nov. 21, 1997 (JP) .................................................. 9-320889

(51) Int. Cl.[7] .................................................. B65G 25/00
(52) U.S. Cl. ........................................ 198/468.1; 198/738
(58) Field of Search .......................... 198/468.01, 468.1, 198/738, 747

(56) References Cited

U.S. PATENT DOCUMENTS

| | | | |
|---|---|---|---|
| 3,563,360 | * 2/1971 | Wickersheim | 198/468.1 |
| 3,708,052 | * 1/1973 | Faure | 198/468.01 |
| 4,029,194 | * 6/1977 | Feurstein et al. | 198/468.1 |
| 4,081,073 | * 3/1978 | Zappia | 198/430 |
| 4,194,614 | * 3/1980 | Hrivnak | 198/468.1 |
| 4,371,076 | * 2/1983 | Nakao | 198/420 |
| 4,548,313 | * 10/1985 | Occhialini et al. | 198/468.1 |
| 4,614,473 | * 9/1986 | Kwauka et lal. | 198/430 |
| 5,056,648 | * 10/1991 | Huber | 198/468.01 |
| 5,617,944 | * 4/1997 | McTaggart | 198/468.1 |
| 5,628,614 | * 5/1997 | Pazdernik et al. | 198/468.01 |

* cited by examiner

*Primary Examiner*—Douglas Hess
(74) *Attorney, Agent, or Firm*—Morrison Law Firm

(57) ABSTRACT

A product transferring device transfers a product onto a conveyor from the side of the conveyor. During transfer, a first device moves the product along the direction of conveyance of the conveyor at about the same speed as the speed of conveyance of conveyor. A second device, operating simultaneously with said first device, moves the product in a direction roughly perpendicular to the direction of conveyance of the conveyor. The product moves in a diagonal path onto the conveyor. The speed match between the first device and the conveyor permits smooth transfer of the product onto the conveyor.

16 Claims, 20 Drawing Sheets

PRIOR ART

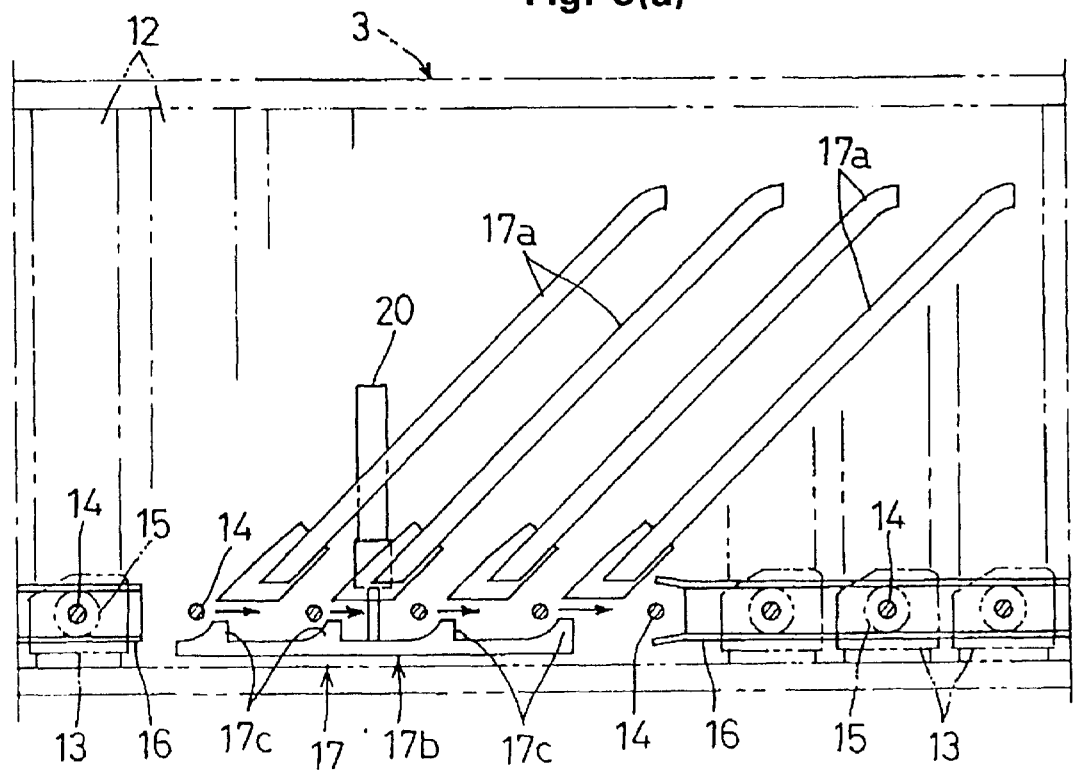

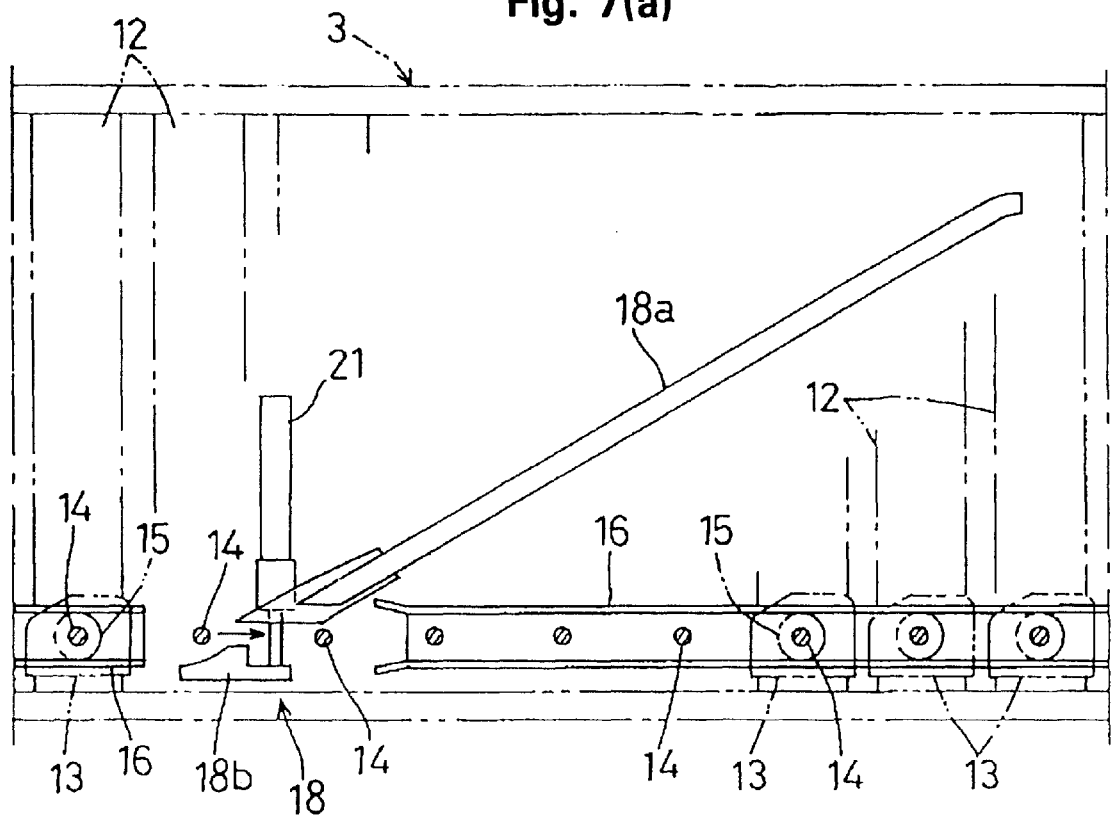

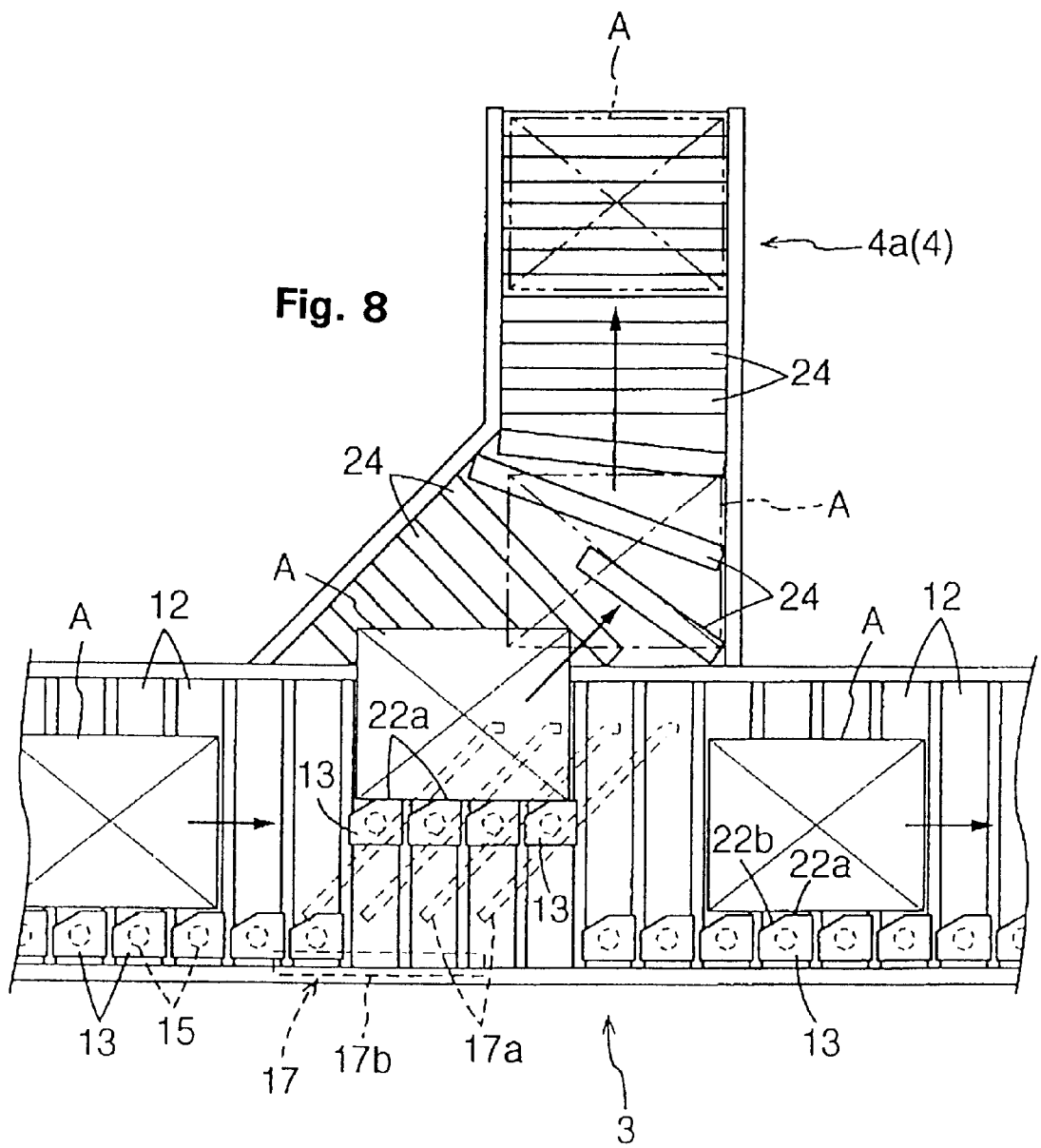

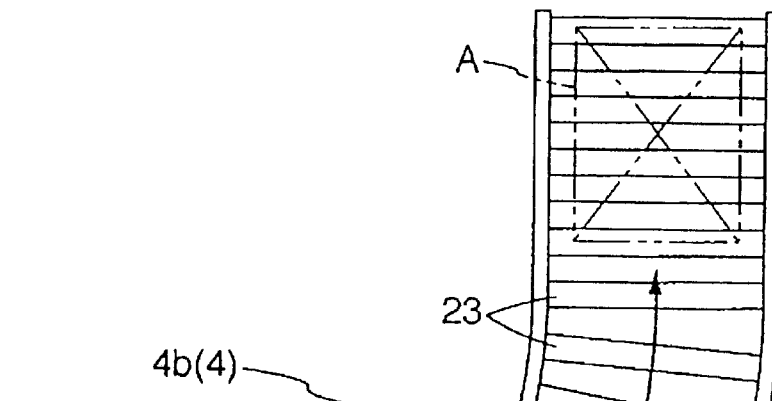
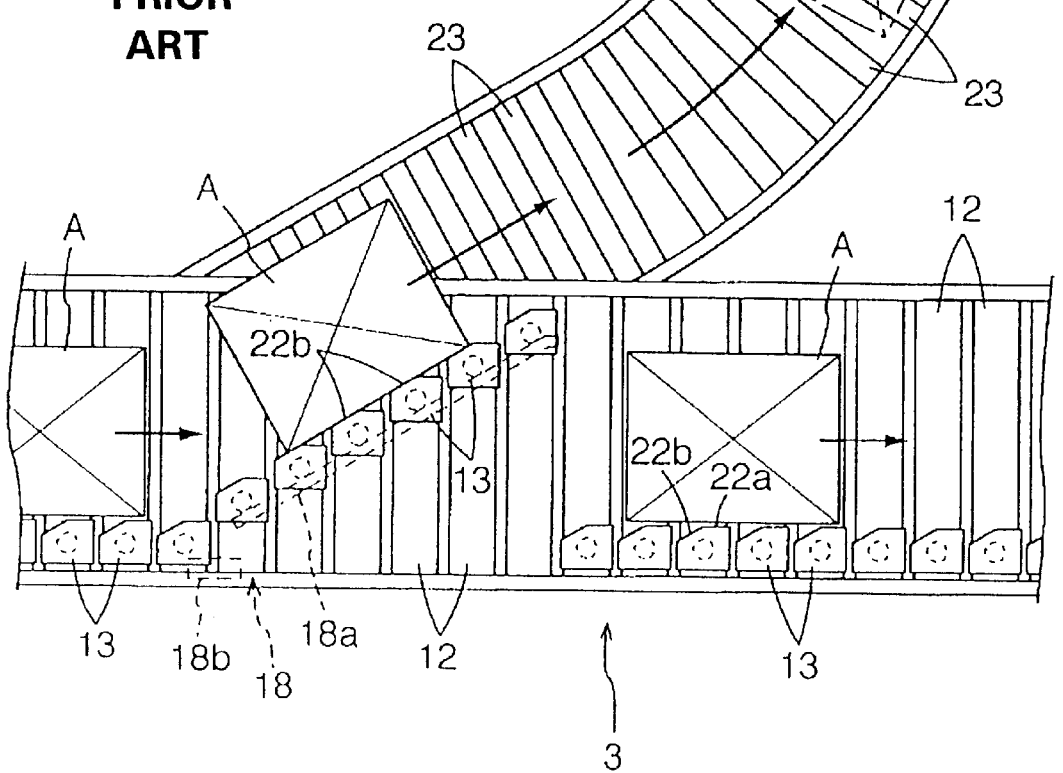
Fig. 9
PRIOR ART

DEVICE FOR TRANSFERRING PRODUCTS

BACKGROUND OF THE INVENTION

The present invention relates to a product transferring device for transferring a product traveling on a conveyor to a receiving location off the side of the conveyor.

Product transferring devices of this type can be broadly categorized into diagonal models and perpendicular models. In the diagonal models, a product is mounted on the conveyor by gradually changing the direction of the product along an arcuate path relative to the conveyor direction. In the perpendicular models, the product is mounted from a direction perpendicular to the direction of the conveyor.

In the former diagonal model, the product to be conveyed has conventionally been moved along an arcuate path that intersects the direction of the conveyor at an angle. A roller conveyor having a plurality of drive rollers may be used for this.

In the perpendicular model, a chain conveyor is used. The chain conveyor has a conveyance path that is roughly perpendicular to the direction of the conveyor on which the product is to be mounted. The conveyor on which the product is to be mounted includes a roller conveyor. The chain conveyor is arranged so that, when seen from the top, it does not interfere with the roller conveyor. This chain conveyor can be moved up and down. When the product reaches the end of the chain conveyor, the chain conveyor is lowered and the product on the chain conveyor is transferred to the roller conveyor.

However, with the diagonal model described above, since the roller conveyor is used to gradually change the direction of the product while it is being mounted on the conveyor, the conveyance path of the roller conveyor necessarily becomes longer. This leads to a larger space requirement, making installation difficult.

While the perpendicular model described above does not require as much space as the diagonal model, transportation of the product by the chain conveyor is halted when the product reaches the end of the chain conveyor. With the product on the chain conveyor stopped in this manner, it is then transferred to the roller conveyor. Thus, when the product is being transferred, the product flow is stopped temporarily. This makes the transfer operation more time-consuming and decreases efficiency.

OBJECTS AND SUMMARY OF THE INVENTION

Accordingly, it is an object of the present invention to overcome these problems and to provide a product transferring device that can smoothly transfer a product without requiring a product to be stopped or its orientation to be changed.

In order to achieve these objects, the invention provides a product transferring device in which a product is conveyed and mounted onto a conveyor from the side of the conveyor. Means for conveying conveys the product along a conveyance direction of the conveyor at a speed identical to or roughly identical to a conveyance speed of the conveyor. Means for loading loads the product on to the conveyor by conveying the product in a direction perpendicular to or roughly perpendicular to the conveyance direction of the conveyor. The conveying means and the loading means are operated simultaneously so that the product is transferred on to the conveyor.

As a result, the large floor space required for the conventional diagonal model described above is not needed. Also, products can be transferred onto the conveyor without requiring the flow of products to be halted as in the conventional perpendicular model described above. Furthermore, since the conveyance speed of the conveying means is the same as or roughly the same as the conveyance speed of the conveyor, the product is neatly transferred to the conveyor without causing disruption in product orientation.

In the invention, the conveying means includes a sliding member that is moved along the conveyance direction of the conveyor to push the product, and the loading means includes a pushing member that is moved along the conveyance direction of the conveyor to push the product. Thus, the combined action of the pushing performed by the sliding member as it moves along the conveying direction of the conveyor and the pushing member, which pushes the product toward the conveyor allows the product to be neatly transferred to the conveyor without causing disruption in product orientation.

In the invention, the pushing member is disposed movably relative to the sliding member. Thus, compared to a case, for example, where the pushing member and the sliding member are separated from each other and are moved independently, this configuration offers a simpler structure. Furthermore, reliable synchronization is provided in the simultaneous operations performed by the pushing member and the sliding member.

In the invention, a transfer conveyor is disposed below the pushing member and the sliding member. The transfer conveyor is driven so that the product is travels in the conveyance direction. Thus, the transfer conveyor takes on a portion of the product conveyance in the loading direction. This reduces the pushing conveyance that the pushing member performs. Also, the transfer conveyor is set to a speed slower than a speed of the pushing member. This allows the pushing member to push the product as desired. Since a product feeding section for feeding a product to the transfer conveyor is disposed toward a conveyance direction of the transfer conveyor, the transfer conveyor is used to reliably feed the product on to the transfer conveyor.

In the invention, the conveying means includes a flat car moving along the conveyance direction of the conveyor, and the loading means includes a pushing conveyor disposed on the flat car. Thus, the product is transferred to the conveyor using the combined action of the conveyance performed by the flat car moving along the conveyance direction of the conveyor, as well as the pushing conveyor disposed on the flat car. Since the product is pushed to the conveyor with the conveyance speed of the pushing conveyor set to be faster than a conveyance speed of the conveyor, the products are neatly transferred on to the conveyor.

Briefly stated, the present invention provides a product transferring device which transfers a product onto a conveyor from the side of the conveyor. During transfer, a first device moves the product along the direction of conveyance of the conveyor at about the same speed as the speed of conveyance of conveyor. A second device, operating simultaneously with said first device, moves the product in a direction roughly perpendicular to the direction of conveyance of the conveyor. The product moves in a diagonal path onto the conveyor. The speed match between the first device and the conveyor permits smooth transfer of the product onto the conveyor.

According to an embodiment of the invention, there is provided a product transferring device in which a product is conveyed and mounted onto a conveyor from the side of said conveyor comprising: first means for conveying said product along a conveyance direction of said product transferring device at a speed substantially equal to a conveyance speed of said conveyor, second means for conveying said product in a direction substantially perpendicular to said conveyance direction of said conveyor, and said first and second means for conveying are operated simultaneously to transfer said product onto said conveyor.

According to a feature of the invention, there is provided a product transferring device for loading a product onto a moving conveyor comprising: a first conveying device, said first conveying device including first means for moving said product in a conveying direction of said moving conveyor, a second conveying device including second means for moving said product in a second direction substantially perpendicular to said conveying direction of said moving conveyor, and simultaneous operation of said first and second conveying devices being effective for moving said product in a diagonal path onto said conveyor.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 6(a) is a plan drawing of a guide rail of a slat conveyor at the beginning of transfer.

FIG. 7(a) is a plan drawing of a guide rail of a slat conveyor at the beginning of transfer.

FIG. 8 is a plan drawing of a loading slat conveyor and a loading conveyor.

FIG. 9 is a plan drawing of a loading slat conveyor and a loading conveyor.

DETAILED DESCRIPTION OF THE PREFERRED EMBODIMENTS

The following is a description, with references to the drawings, of a product transferring device according to the present invention as implemented in an automated warehouse.

Figure 1:
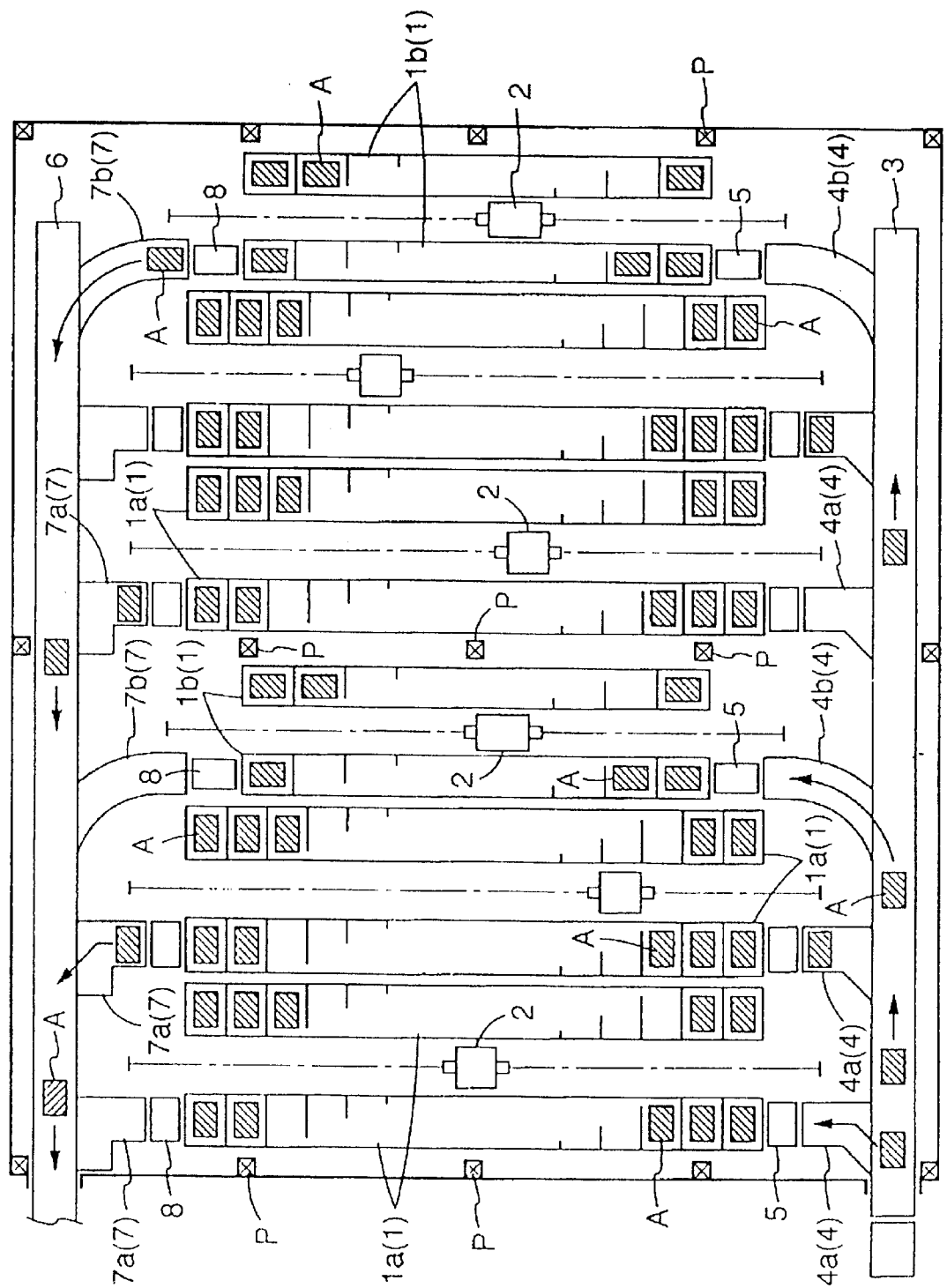
FIG. 1 is a plan drawing of an entire automated warehouse.

Referring to FIG. 1, in an automated warehouse, a plurality of spaced-apart pairs of product holding shelves 1 are disposed parallel to each other. Stacker cranes 2 are interposed between the pairs of product holding shelves 1 to move along the spaces between pairs of product holding shelves 1.

Each stacker crane 2 includes an elevatable platform having a fork that is extended and retracted. The movement of the stacker crane 2, the raising and lowering of the platform, and the extending and retracting of the fork allow a product A, such as a container or a cardboard box holding various items, to be mounted on and removed from a product holding section of the product holding shelves 1.

A loading slat conveyor 3 is disposed on the loading side of each product holding shelf 1 to allow the product A to be moved in. Loading conveyors 4 are disposed between the loading slat conveyors 3 and the pairs of product holding shelves 1. At the terminal end of the loading conveyor 4, a loading lifter 5 transfers the products A to the stacker cranes 2.

Figure 2:
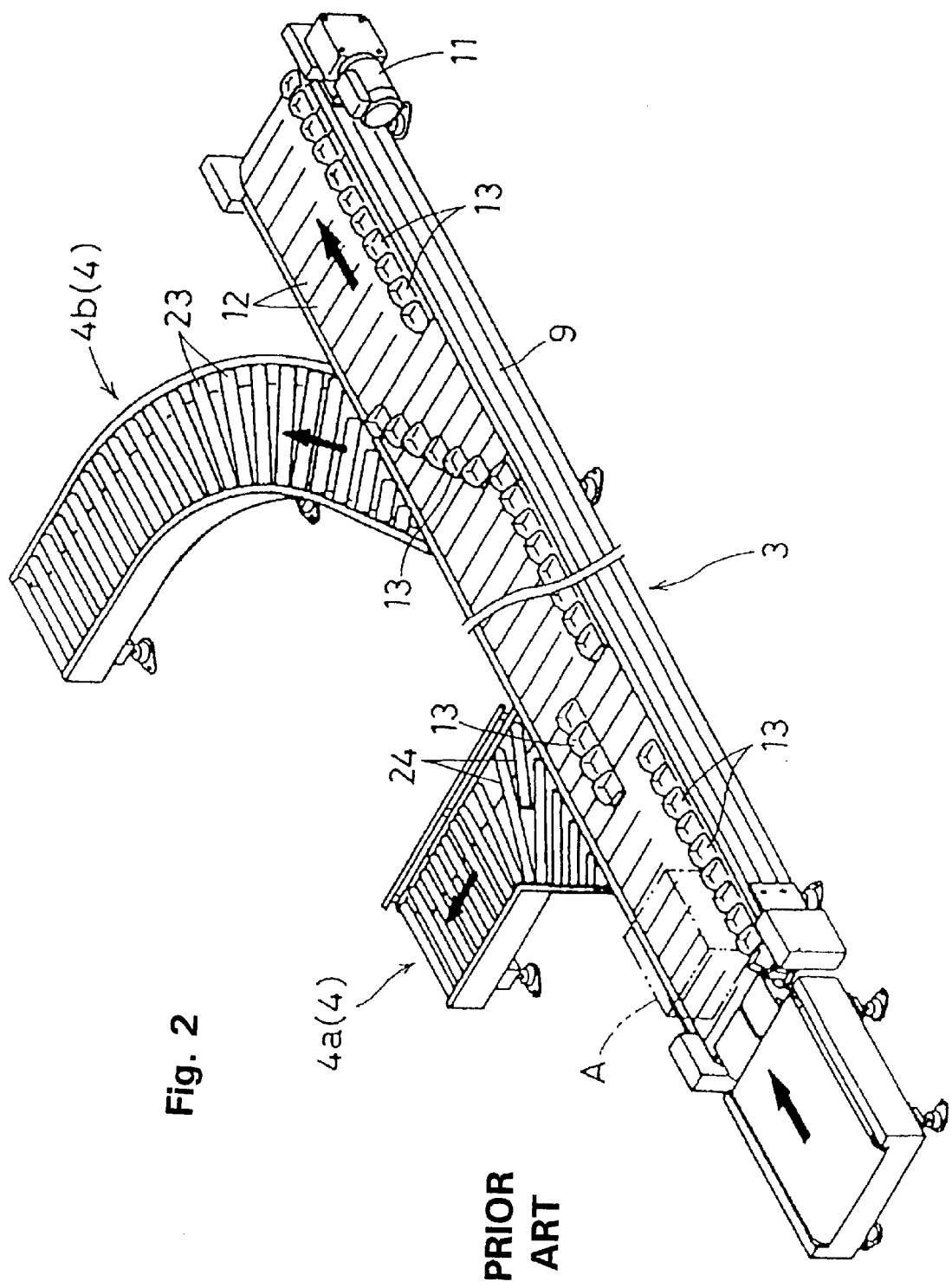
FIG. 2 is a perspective drawing of an unloading slat conveyor and an unloading conveyor.

Referring to FIG. 2, the loading conveyor 4 includes two types of loading conveyors having different structures. A perpendicular loading conveyor 4a conveys the product A in a direction that intersects roughly perpendicular to the direction of conveyance of loading slat conveyor 3. A diagonal loading conveyor 4b conveys the product A along arcuate path diagonal to the direction of conveyance of the loading slat conveyor 3.

The product A is conventionally a rectangular shape when seen from above. When the rectangular product A is to be stored in the product holding shelves 1, it should, as a rule, be stored longitudinally when seen from the stacker crane 2. However, there are some cases where storing all the products A longitudinally is disadvantageous due to conditions imposed by the physical structure of the automated warehouse.

Returning to FIG. 1, in an example of this embodiment, a plurality of pillars P may obstruct the center of the space. If the products A were all to be stored longitudinally, the pillars P would get in the way. Space would need to be left open around the pillars P. The unused space would reduce the available number of product holding shelves 1. To make maximum use of the available space, a pair of special product holding shelves 1b is spaced apart near the center of the drawing to hold the products A laterally as seen from the stacker crane 2. A stacker crane 2 is disposed between the pair of product special holding shelves 1b. For the same reason, a pair of special product holding shelves 1b is disposed near the right-side wall of the space to hold the products A laterally.

Thus, the product holding shelves include two types of shelves: the product holding shelves 1a, which hold the products A longitudinally, and the special product holding shelves 1b, which hold the products A laterally. The perpendicular loading conveyor 4a is used as the loading conveyors for loading the product A to the longitudinally-storing product holding shelves 1a. The product A is conveyed longitudinally via loading slat conveyor 3 and is then conveyed by the perpendicular loading conveyor 4a while maintaining a lateral orientation.

The diagonal loading conveyor 4b is used to load the product A to laterally-storing special product holding shelves 1b. The product A is conveyed longitudinally via loading slat conveyor 3 and is gradually reoriented so that is loaded longitudinally.

Unloading slat conveyors 6, on the unloading side of product holding shelves 1, unload the product A. Unloading conveyors 7 are disposed between the pairs of product holding shelves 1 and the unloading slat conveyor 6. An unloading lifter 8 is disposed at the end of unloading conveyor 7 at which conveyance starts, for transferring the product A to the stacker crane 2.

Figure 3:
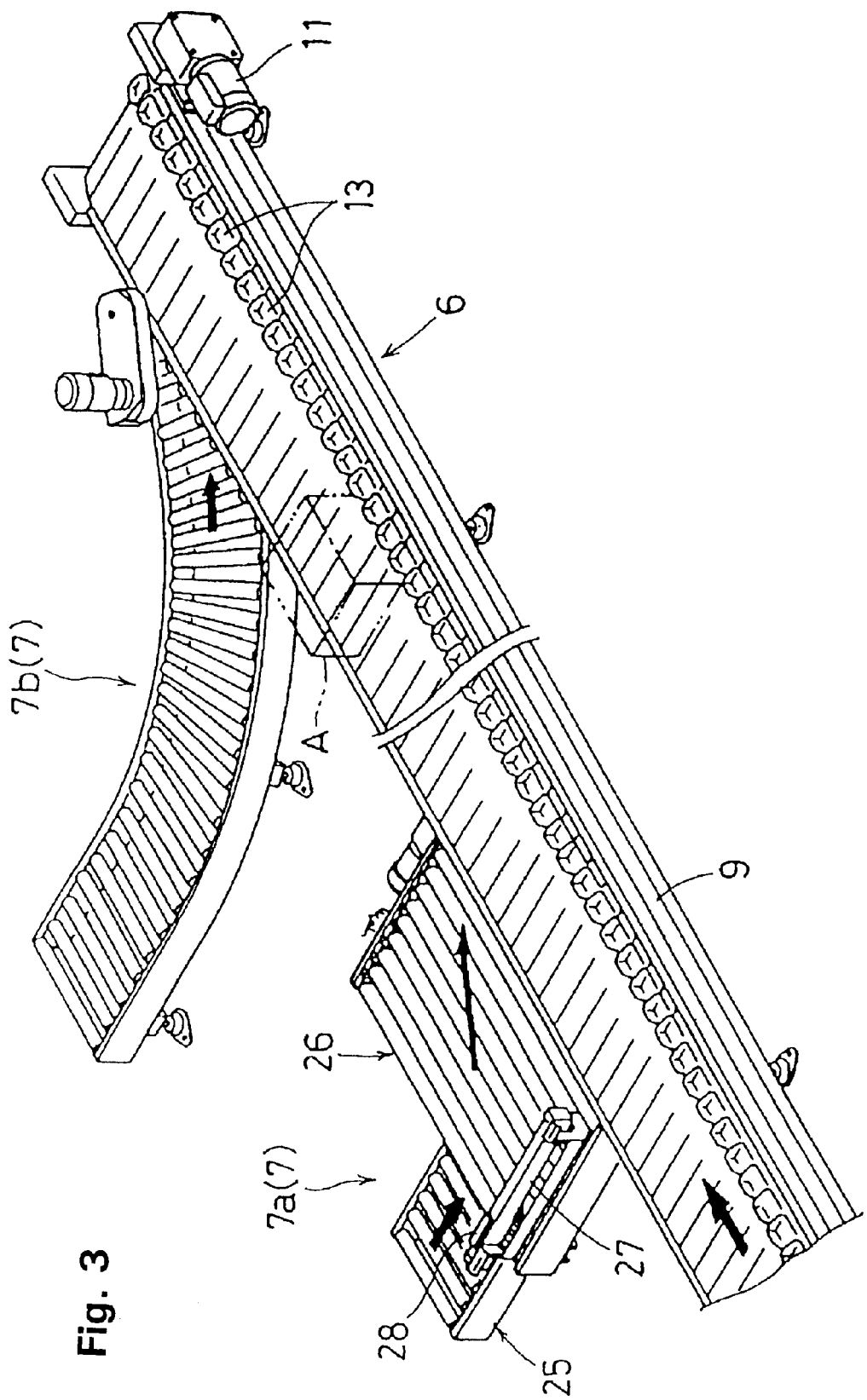
FIG. 3 is a perspective drawing of an unloading slat conveyor and an unloading conveyor.

Referring to FIG. 3, there are also two types of unloading conveyors 7. One type is the perpendicular unloading conveyor 7a, which conveys the product A laterally while maintaining it lateral or roughly perpendicular to the unloading slat conveyor 6. The unloading conveyors 7 are provided for the longitudinally-storing product holding shelves 1a, and at the terminal ends of the unloading conveyors 7 are disposed product transferring devices 26, which will be described later. The other type of unloading conveyor is the diagonal unloading conveyor 7b, which conveys the product A longitudinally and intersects with the unloading slat conveyor 6 diagonally so that the product A is gradually reoriented to be longitudinally relative to the unloading slat conveyor 6. The diagonal unloading conveyor 7b is used for the lateral-storing special product holding shelves 1b.

Figure 4:
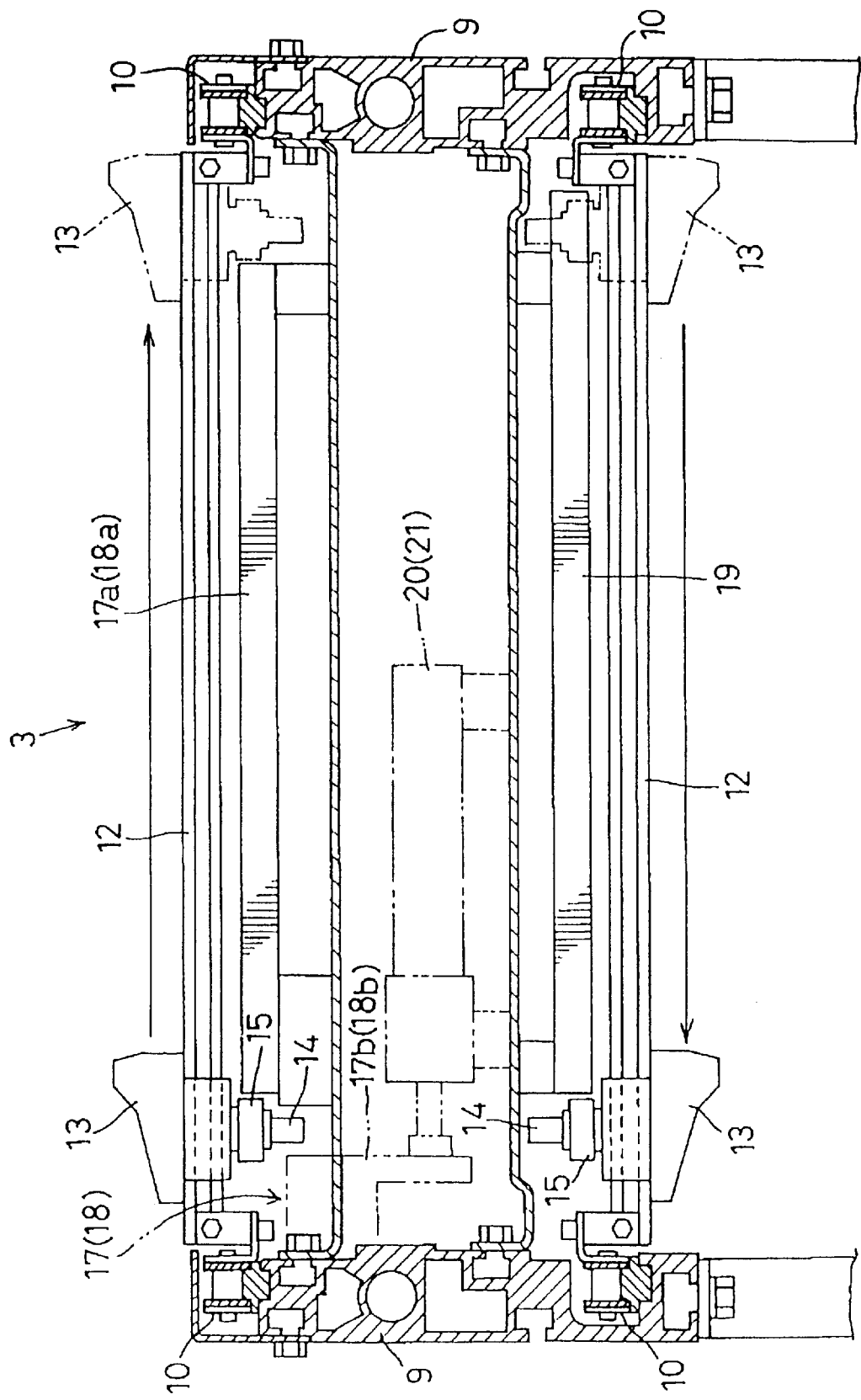
FIG. 4 is a cross-section drawing of a slat conveyor.
Figure 5:
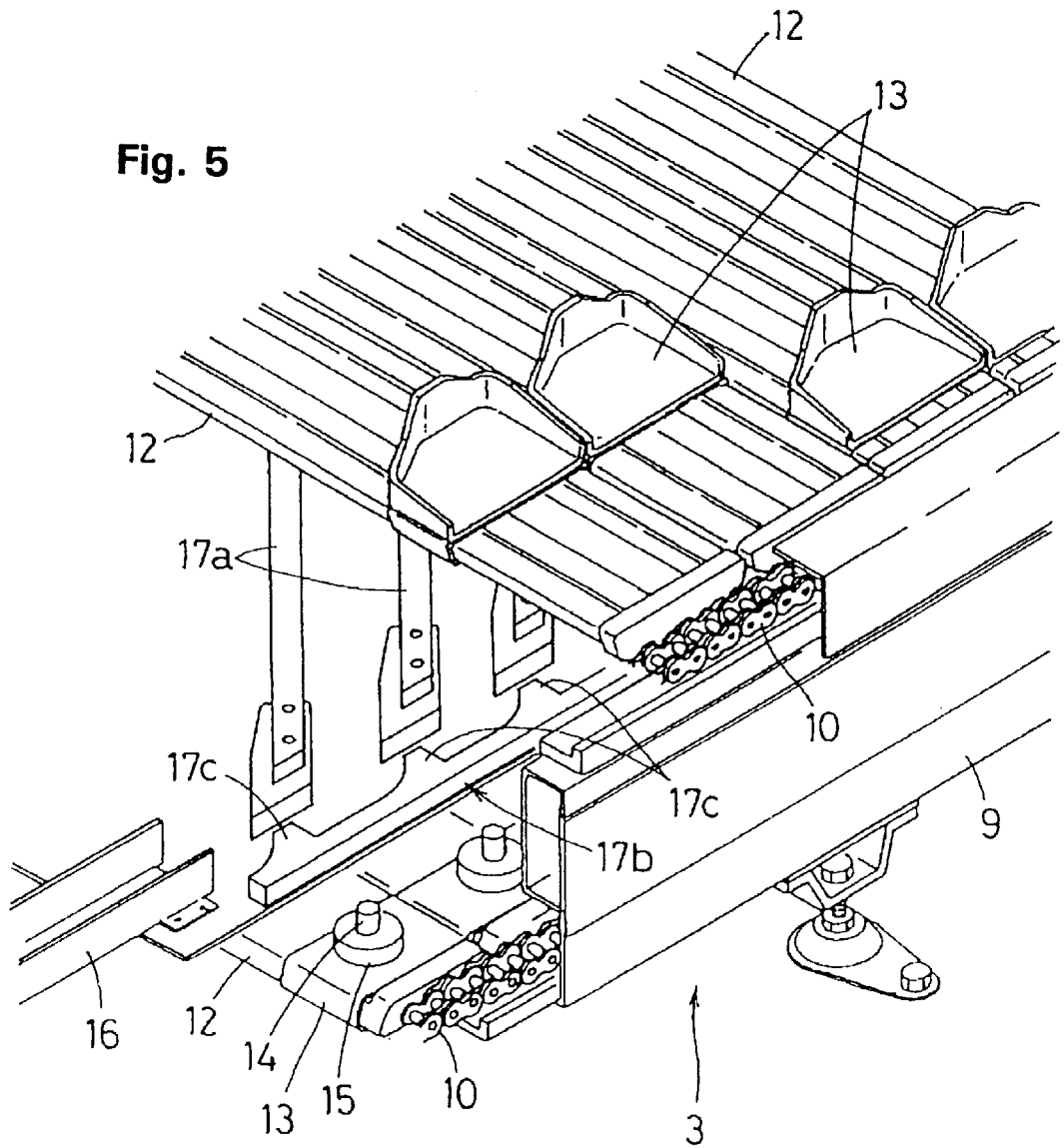
FIG. 5 is a partially cut away perspective drawing of a slat conveyor.

The loading slat conveyor 3 and the unloading slat conveyor 6 both have the same structure. Referring to FIG. 4 and FIG. 5, a pair of frames 9, to the right and left when seen from the direction of conveyance, include drive sprockets and free sprockets at their ends. Left and right endless chains 10 are wrapped around the sprockets. The drive sprockets are driven by an electric motor 11 (FIGS. 2 and 3). This rotates the left and right chains 10 in the direction of conveyance at the top of the frame 9 and in the reverse direction at the bottom of the frame 9.

A plurality of long, thin slats 12 are attached across the left and right chains 10. A pushing shoe 13 is movably fitted to the outside of the slats 12 so that they push the product A toward the loading conveyor 4. A pin 14 projects downward from the lower portion of the pushing shoe 13. Pin 14 is rotatably attached to a guide ring 15.

Figure 6B:
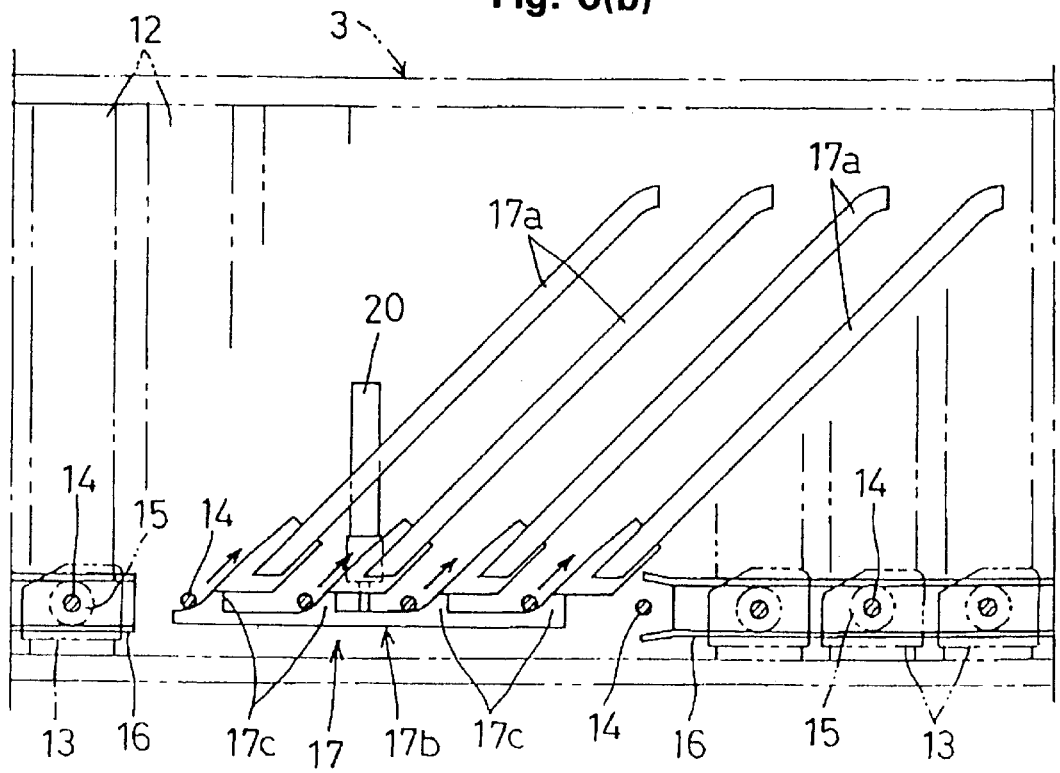
FIG. 6(b) is a plan drawing of a guide rail of a slat conveyor at the end of transfer.

Referring to FIGS. 6(a), 6(b), 7(a) and 7(b), right and left main guides 16 inside the left and right frames 9, extend in the direction of the chains 10. The main guides 16 guide the guide rings 15 of the pushing shoes 13. Referring to FIGS. 6(a) and 6(b), a plurality of perpendicular branch guides 17a are disposed on the left and right main guides 16. These branch guides 17a are used for the perpendicular loading conveyors 4a. Branch guides 17a are connected diagonally to the main guides 16.

Figure 7B:
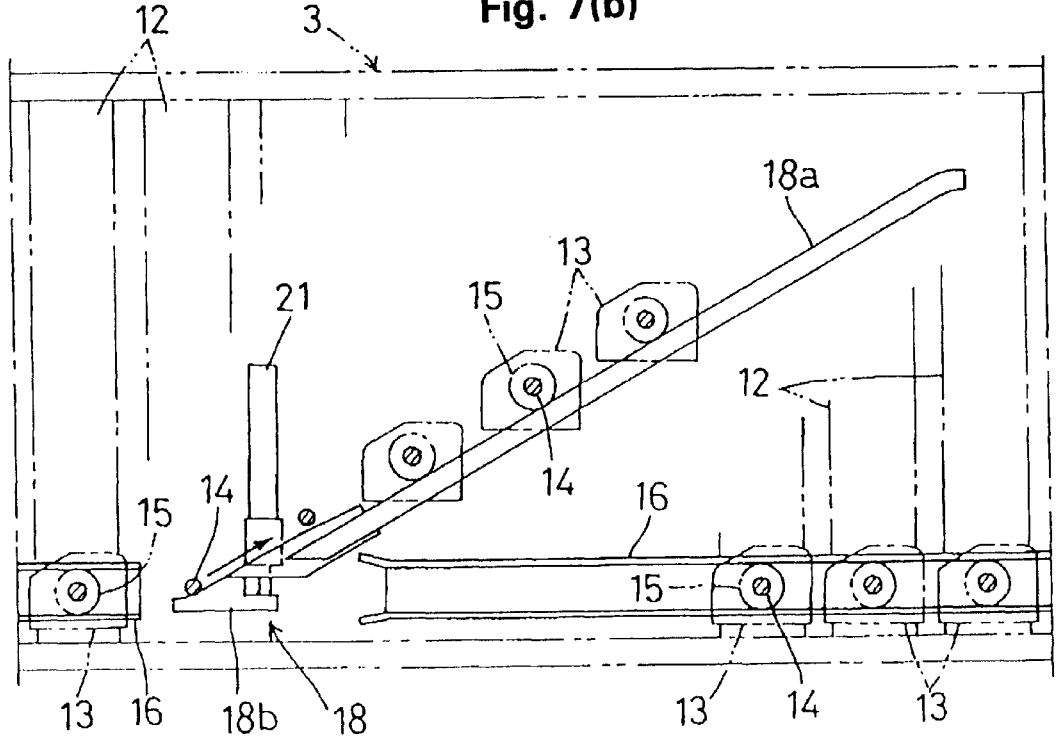
FIG. 7(b) is a plan drawings of a guide rail of a slat conveyor at the end of transfer.

Referring to FIGS. 7(a) and 7(b), a single diagonal branch guide 18a is connected diagonally to the main guides 16 for the diagonal loading conveyors 4b.

A single return guide 19 (see FIG. 4) connects diagonally to the main guides 16 below the main guides 16. Thus, in the left and right main guides 16, one guide extends across the entire length of the endless chain 10, and the other guide extends along the upper chain 10 and stops at the return guide 19.

A perpendicular re-orienting tool 17b having a plurality of re-orienting members 17c is disposed near the perpendicular branch guide 17a. The perpendicular re-orienting tool 17b takes the plurality of guide rings 15 guided by the main guides 16 and re-orients them all at once toward the perpendicular branch guide 17a. The perpendicular re-orienting tool 17b is extended and retracted by a perpendicular air cylinder 20 or the like. The perpendicular branch guide 17a and the perpendicular re-orienting tool 17b form a perpendicular switching means 17, which switches a plurality of pushing shoes 13 to a roughly straight line along the direction of conveyance of loading slat conveyor 3.

Similarly, a diagonal re-orienting tool 18b is disposed near the diagonal branch guide 18a to sequentially re-orient the plurality of guide rings 15, guided by the main guide 16, toward the diagonal branch guide 18a. The diagonal re-orienting tool 18b is extended and retracted by a diagonal air cylinder 21. The diagonal branch guide 18a and the diagonal re-orienting tool 18b form diagonal switching means 18, which switches a plurality of pushing shoes 13 so that they move across diagonally relative to the direction of conveyance of the loading slat conveyor 3.

With the loading slat conveyor 3 and the unloading slat conveyor 6 formed as described above, the left and right chains 10 are rotated by the drive sprocket and the slats 12 and the pushing shoes 13 fitted to the outside thereof follow this rotation, thus conveying the product A mounted on the slats 12.

Referring to FIG. 6(b), when the product A is to be transferred to a perpendicular loading conveyor 4a, the perpendicular air cylinder 20 projects the perpendicular re-orienting tool 17b toward the main guide 16. As a result, the pins 14, which support the plurality of guide rings 15 and which have been displaced along the main guide 16, are placed in contact with and guided by the re-orienting members 17c. The plurality of guide rings 15 are re-oriented simultaneously along the perpendicular branch guides 17a.

Referring to FIG. 8, the movement of the slats 12 in the direction of conveyance and the guiding action applied by the perpendicular branch guides 17a on the guide wheels 15 causes the plurality of pushing shoes 13 to push the product A onto the perpendicular loading conveyor 4a so that it is displaced roughly in a straight line along the conveyance direction of the loading slat conveyor 3. It will be noted that the product A is moved onto perpendicular loading conveyor 4a without rotation.

Referring to FIG. 7(b), when the product A is to be transferred to a diagonal loading conveyor 4b, the diagonal air cylinder 21 projects the diagonal re-orienting tool 18b toward the main guide 16. As a result, the pins 14, which support the plurality of guide rings 15 and which have been displaced along the main guide 16, are placed in contact with and guided by the diagonal re-orienting tool 18b, thus causing the pins 14 to be re-oriented sequentially along diagonal branch guide 18a.

Referring to FIG. 9, the movement of slats 12 in the direction of conveyance and the guiding action applied by the diagonal branch guide 18a onto on the guide wheels 15 causes the plurality of pushing shoes 13 to push the product A so that it moves diagonally relative to the direction of conveyance of the slat conveyors 3, 6 and is transferred to diagonal loading conveyor 4b. The pushing shoes 13 used for transfer to the perpendicular loading conveyors 4a and the diagonal loading conveyors 4b are then brought back to the main guide 16 by the return guide 19.

Since the pushing shoes 13 are used for transfer operations in both the perpendicular loading conveyors 4a and the diagonal loading conveyors 4b, the pushing shoes 13 include a perpendicular pushing surface 22a, which is used for transfer to the perpendicular loading conveyors 4a, and a diagonal pushing surface 22b, which is used for transfer to the diagonal loading conveyors 4b.

The perpendicular loading conveyors 4a, the diagonal loading conveyors 4b, and the diagonal unloading conveyors 7b are all formed as roller conveyors having a plurality of rotatable rollers. The diagonal loading conveyors 4b and the diagonal unloading conveyors 7b are formed identically, with the only difference being the direction of conveyance.

Referring to FIG. 9, a plurality of diagonal rollers 23 having different lengths are disposed to form a gentle arc having gradual angle changes. The diagonal rollers 23 are rotated in synchronization with each other by an electric motor not shown in the figure.

Referring again to FIG. 8, the perpendicular loading conveyors 4a are, in contrast, formed with a plurality of perpendicular rollers 24, having different lengths, that are disposed to form a sudden angle change. The perpendicular rollers 24 are also rotated in synchronization with each other via an electric motor not shown in the figure. The angle at which the perpendicular rollers 24 are placed is generally perpendicular to the net direction of travel of the product A. Similarly, the rotational speed of perpendicular rollers 24 is approximately equal to the net linear speed of the product A along the perpendicular loading conveyors 4a.

Figure 10:
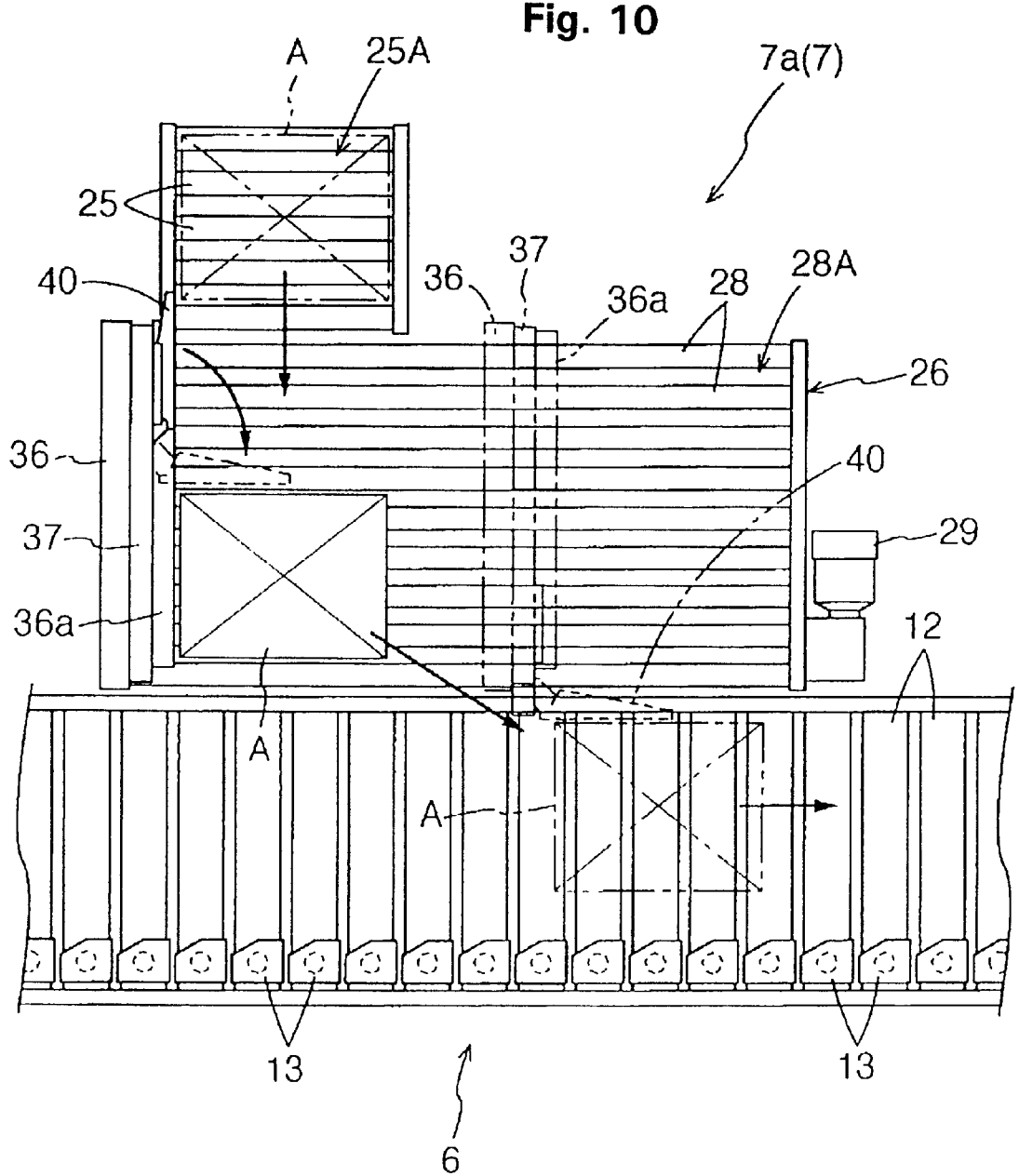
FIG. 10 is a plan drawing of an unloading slat conveyor and a n unloading conveyor.
Figure 11:
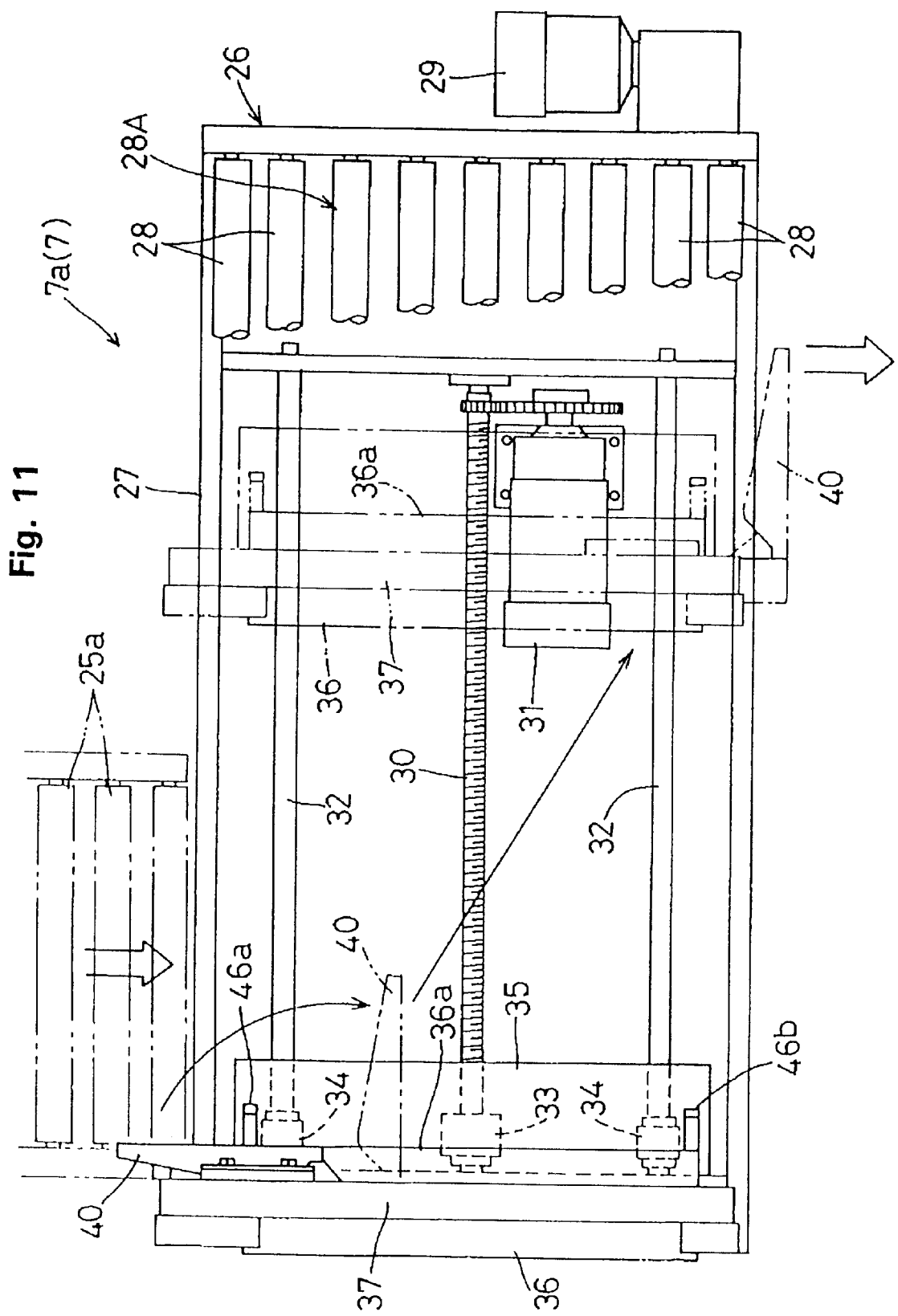
FIG. 11 is a partially cut away plan drawing of a product transferring device.
Figure 12:
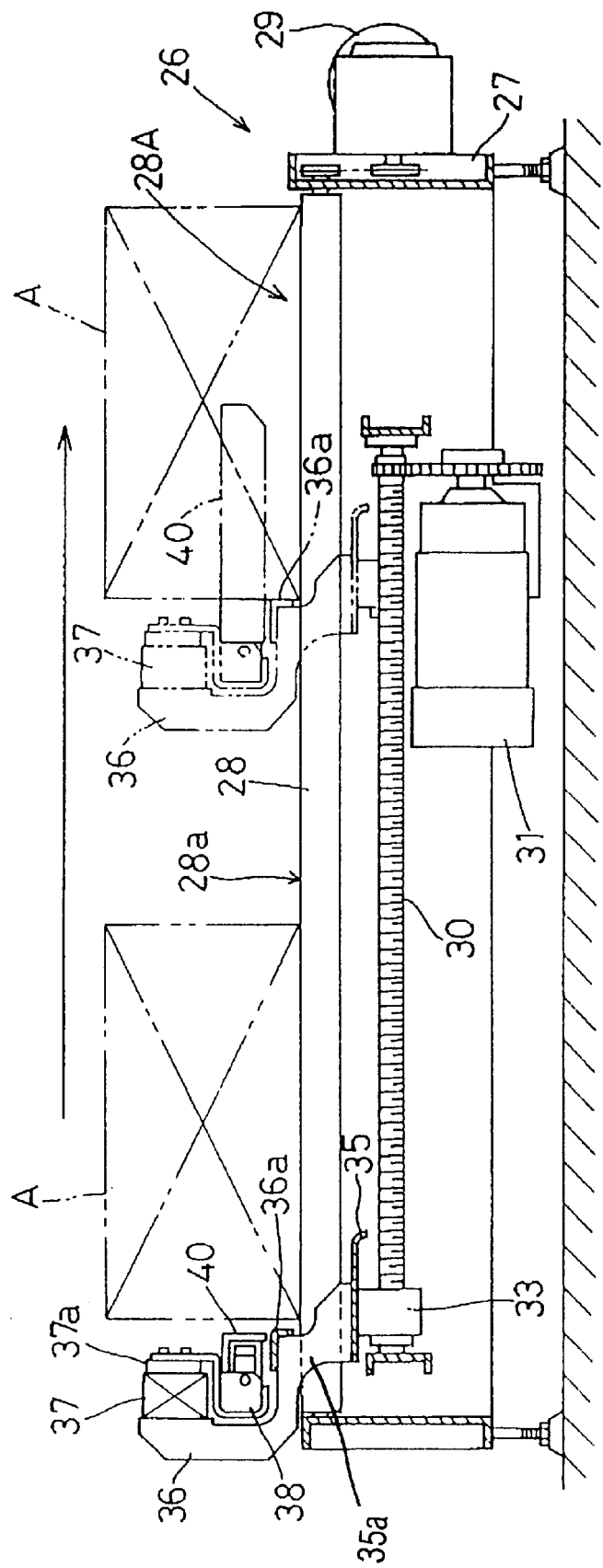
FIG. 12 is a front-view drawing of a vertical cross-section of a product transferring device.
Figure 13:
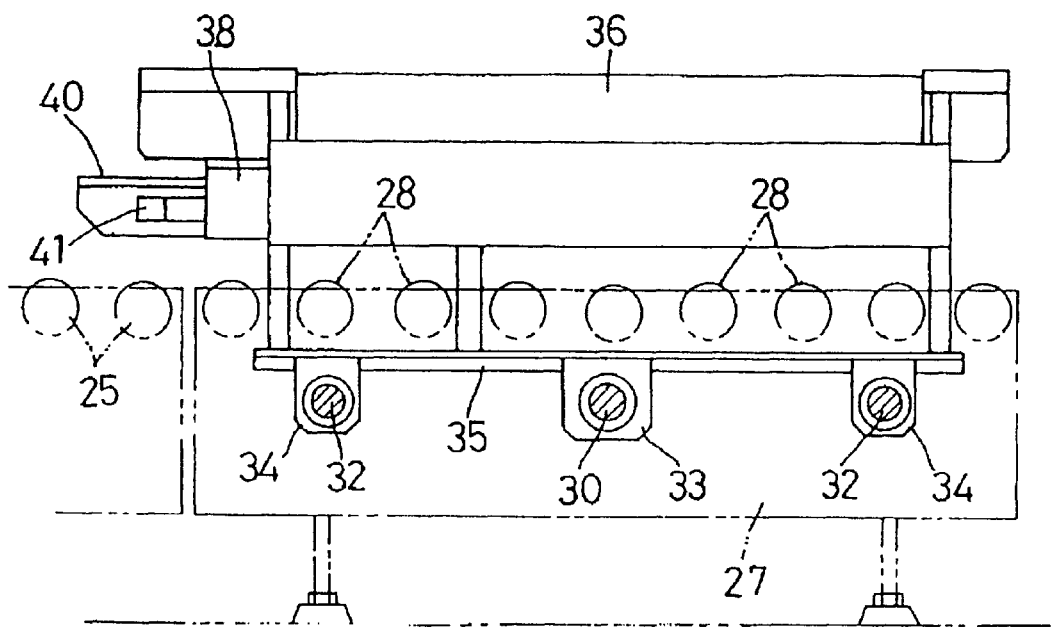
FIG. 13 is a side-view drawing of the main elements of a product transferring device.
Figure 14:
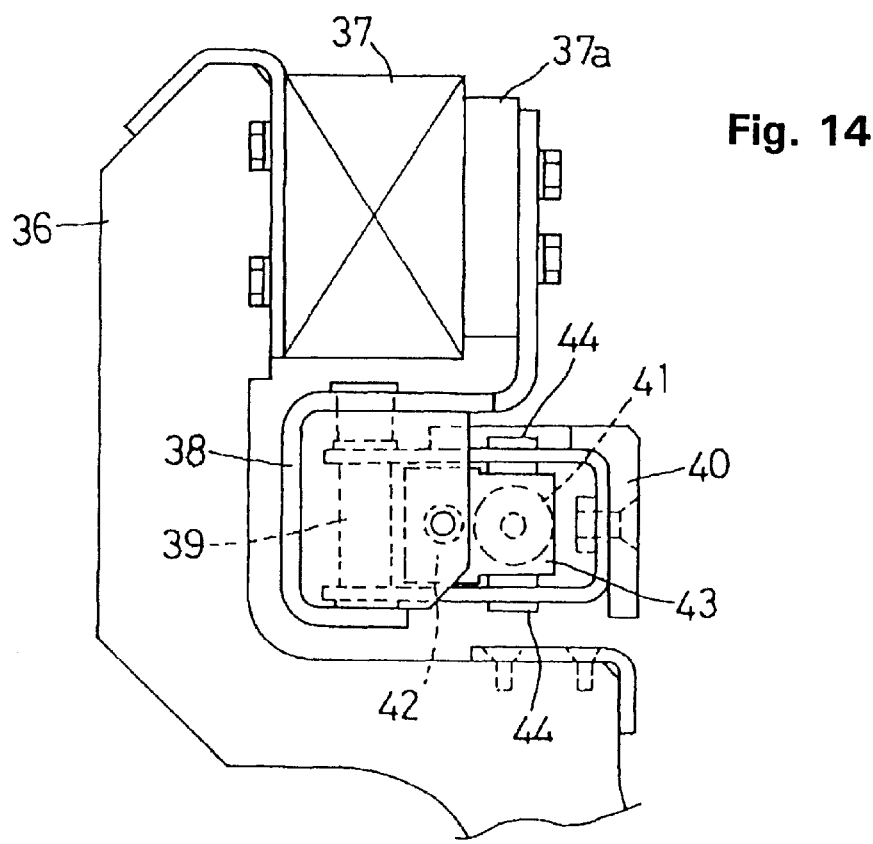
FIG. 14 is a front-view drawing of the main elements of a product transferring device.
Figure 15A:
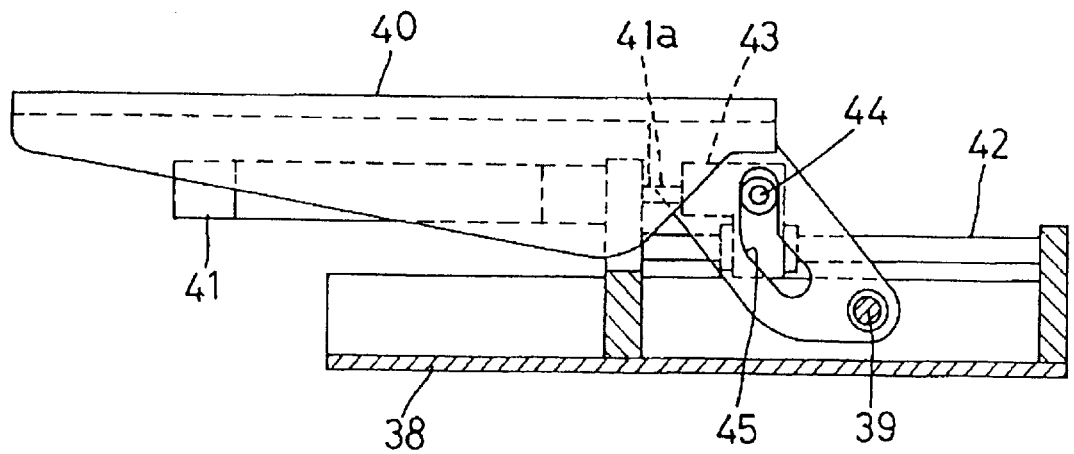
FIGS. 15(a) and 15(b) are plan drawings of the main elements of a product transferring device.
Figure 15B:
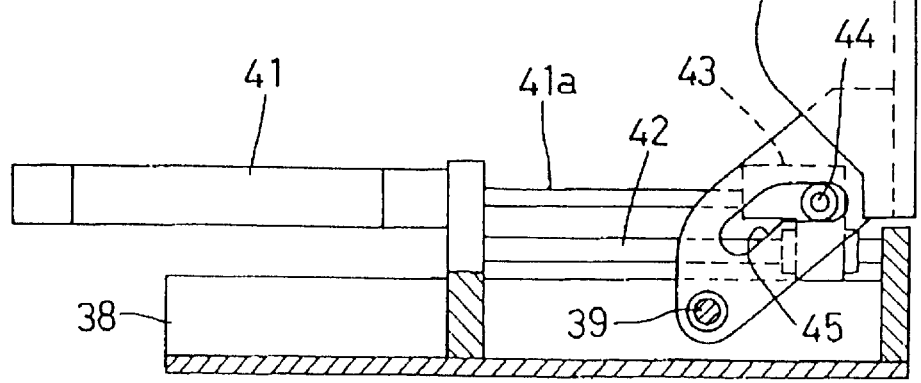

Referring to FIG. 10, perpendicular unloading conveyor 7a includes a roller conveyor 25a, which serves as a product feeding section that includes a plurality of rollers 25 rotated by an electric motor not shown in the figure. The product transferring device 26 is disposed at the terminal end of the of the perpendicular loading conveyor 7a.

Referring to FIG. 11 through FIG. 15, the product transferring device 26 includes a frame 27 formed in a roughly rectangular shape when seen from above. A plurality of transfer rollers 28 are rotatably supported on the frame 27 along the direction of conveyance of the unloading slat conveyor 6. An electric roller motor 29 attached to the frame rotates the transfer rollers 28 at a uniform speed.

The rotation of the transfer rollers 28 by the electric roller motor 29 causes a transfer conveyor 28A, which is formed from the plurality of transfer rollers 28, to convey the product A to the side of the unloading slat conveyor 6 in a roughly perpendicular orientation. The upper surfaces of the transfer rollers 28 form a transfer surface 28a for transferring the product A onto the unloading slat conveyor 6.

Below the transfer rollers 28, a single threaded shaft 30 is rotatably supported by the frame 27, extending in the direction of the transfer rollers 28. The threaded shaft 30 is connected to an electric threaded-shaft motor 31, which is attached to the frame 27. On either side of the threaded shaft 30, guide shafts 32 are extended in the same direction as the threaded shaft 30 and are fixed to the frame 27.

The threaded shaft 30 is screwed into a nut member 33. Guide blocks 34 are slidably fitted to the outside of the two guide shafts 32. A support member 35 connects and supports the nut 33 and the guide blocks 34. A connecting member 35a, connected to the support member 35, passes between the transfer rollers 28 and extends upward. On the extended end of the connecting member 35a is fixed a sliding member 36, which serves as means for conveying. Sliding member 36 includes a pushing section 36a for pushing the product A. The sliding member 36 is positioned above the transfer rollers 28.

The sliding member 36 has a long, thin shape that is perpendicular to the direction of conveyance of the unloading slat conveyor 6. Sliding member 36 has a length that extends over roughly the entire width of the transfer surface 28a. An air-driven rodless cylinder 37 is attached above the sliding member 36, extending longitudinally. A movable frame 38 is attached to a piston member 37a connected to the piston of the rodless cylinder 37.

A pushing member 40 is movably attached to the movable frame 38 via a pin 39 that extends vertically. Pushing member 40 serves as means for pushing the product A. An air cylinder 41, which controls the movement of the pushing member 40, is attached longitudinally relative to the movable frame 38. A sliding guide shaft 42 extending along the extension/retraction axis of a rod 41a is also attached to the movable frame 38.

The rod 41a of the air cylinder 41 is attached to a sliding block 43. The sliding block 43 is slidably fitted to the outside of the sliding guide shaft 42. A cam follower 44, formed as a free roller attached to the sliding guide shaft 42, is fitted to an angled cam opening formed on the pushing member 40.

The extension and retraction of the air cylinder 41 rotates the pushing member 40 about the pin 39 by action of the cam follower 44 and the cam opening 45. The pushing member 40 is switched between the retracted position aligned with the sliding member 36, shown in FIG. 15(a), and the projected position extending roughly perpendicularly outward from the sliding member 36, shown in FIG. 15(b). By keeping the pushing member 40 in the projected position while operating the rodless cylinder 37, the pushing member 40 moves in a reciprocating motion along the sliding member 36.

With the product transfer device 26 as described above, the product A is loaded from the roller conveyor 25A while the transfer rollers 28 are being rotated. A load presence detecting means 46a, disposed toward the entry side of the product transfer device 26, detects the completion of the loading of the product A onto the product transferring device 26. When the upstream end of the product A passes the load presence detecting means 46a, the air cylinder 41 is activated to extend the rod 41a. This causes the pushing member 40 to switch to the projected position shown in FIG. 15(b). The rodless cylinder 37 is activated to displace the movable 38 frame toward the unloading slat conveyor 6.

This displacement of the movable frame 38 is performed at a speed that is faster than the speed of conveyance of the transfer conveyor 28A. Thus, this displacement is accompanied by the pushing member 40, which is in the projected position, pushing the product A and forcing it toward the unloading slat conveyor 6.

A load detecting means 46b, disposed at the exit side of the product transfer device 26, detects that the leading end of the product A has reached its location. At that time forward motion of the movable frame 38 is stopped to retain the movable frame 38 in its displaced state. The electric threaded-shaft motor 31 rotates the threaded shaft 30. This causes the sliding member 36 to move along the threaded shaft 30, i.e., along the direction of conveyance of the unloading slat conveyor 6, and the pushing section 36a on the sliding member 36 pushes the product A.

Thus, the sliding member 36 is displaced along the direction of conveyance of the unloading slat conveyor 6, while the pushing section 36a conveys the product A along the conveyance direction of the unloading slat conveyor 6. At the same time, the pushing member 40, which moves along the sliding member 36, conveys the product A in a loading direction roughly perpendicular to the conveyance direction for the unloading slat conveyor 6. The net motion of the product A cuts across diagonally on the transfer surface 28a, as indicated by the diagonal arrow in FIG. 11. This motion is continued until the product A is pushed onto the unloading slat conveyor 6.

The speed at which the sliding member 36 is displaced is set to be roughly the same as the speed of conveyance of the unloading slat conveyor 6. Thus, as the product A is transferred onto the unloading slat conveyor 6, its forward speed is in synchronization with the conveyance speed of the unloading slat conveyor 6, thus preventing disorientation of the product A during transfer.

Figure 16:
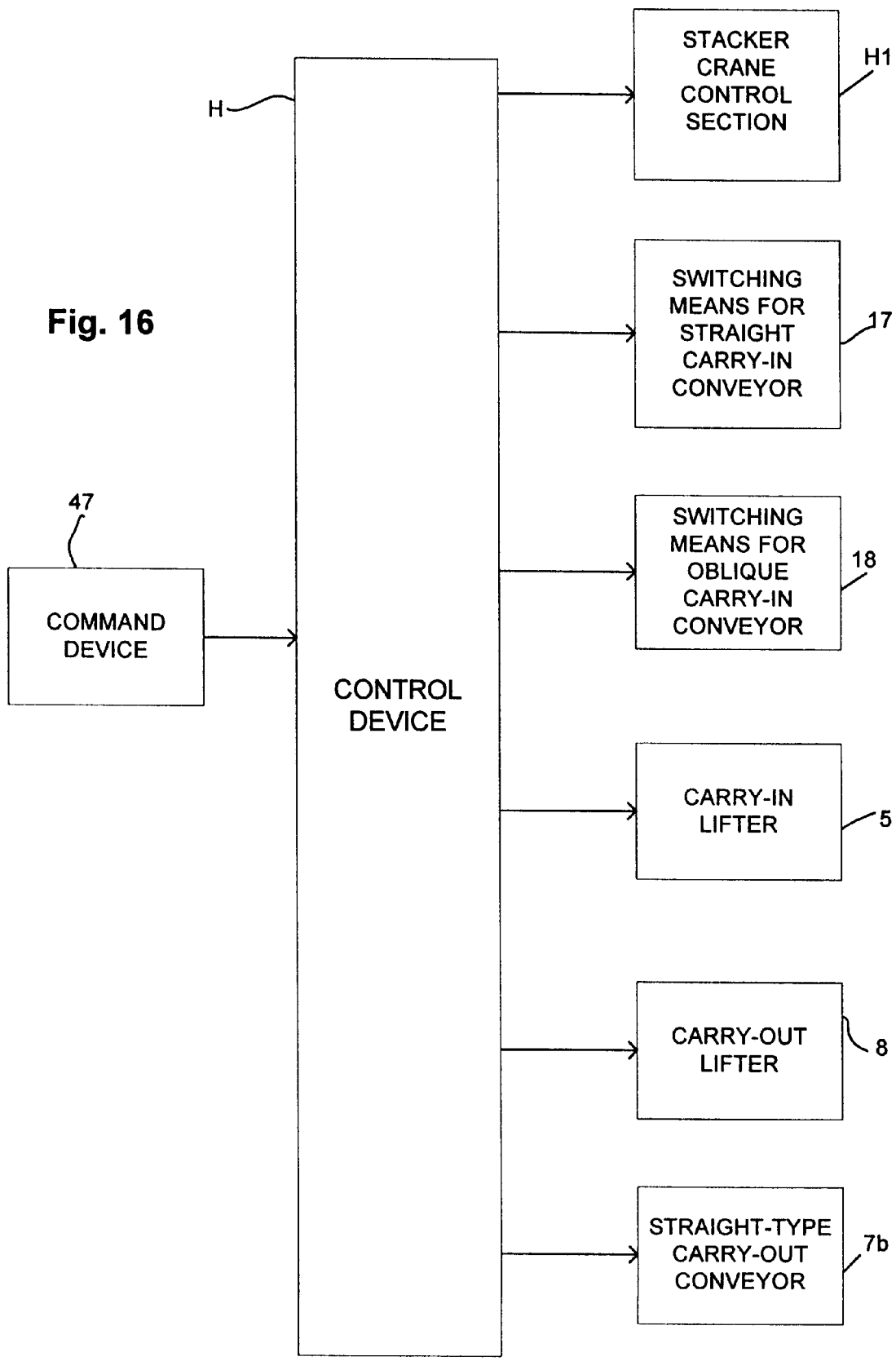
FIG. 16 is a schematic block diagram of a control device.

Referring to FIG. 16, the operations of the automated warehouse as described above are all controlled by a control device H, which serves as controlling means. The control device H may be of any type, but preferably is based on the use of a microprocessor. The control device H communicates with a stacker crane control section H1, which controls the stacker cranes 2. A command device 47 issues instructions to the control device H which, in turn issues commands to the stacker crane control section H1 which, in turn, issues control signals to the switching means 17, 18 for the loading slat conveyor 3.

The following is a description of the control operations for the automated warehouse performed by the control device H. When the product A is to be loaded, information relating to the product A to be loaded is entered into the command device 47. Based on the entered information, the control device H selects the product holding shelf 1 and the product storage position at which the product A is to be loaded. The product A is conveyed via the loading slat conveyor 3. When it reaches a prescribed position relative to the loading conveyor 4 for the loading product holding shelf 1 to be used, a signal from a load detecting means (not shown in the figure) activates the appropriate one of switching means 17, 18.

If the loading conveyor 4 is a perpendicular loading conveyor 4a, then the perpendicular air cylinder 20 is used to project perpendicular switching means 17 toward the main guide 16. Then, a prescribed number of the guide wheels 15 of the pushing shoes 13 are re-oriented from the main guide 16 toward the perpendicular branch guide 17a. A prescribed number of pushing shoes 13 connected to the guide wheels 15 push the product A along the conveyance direction for the loading slat conveyor 3 and transfer the product A to the perpendicular loading conveyor 4a. If a diagonal loading conveyor 4b is to be used, the diagonal air cylinder 21 projects diagonal switching means 18 toward the main guide 16. A prescribed number of pushing shoes 13 are moved so that they sequentially cut diagonally across the conveyance direction of the loading slat conveyor 3, thus pushing the product A so that it is transferred to the diagonal loading conveyor 4b.

When the product A reaches the loading lifter 5, a signal from means for detecting load presence (not shown in the figure) causes the loading lifter 5 to be raised, and the fork of the stacker crane 2 engages the product A.

Then, the fork of the stacker crane 2 is extended and retracted so that the product A is transferred to the platform of the stacker crane 2. The movement of the stacker crane 2, the raising and lowering of the platform, and the extending and retracting of the fork are used to mount the product A onto the product holding position on the product holding shelf 1. If the product holding shelf 1 is a product holding shelf 1a that holds the product A longitudinally, then product A is stored longitudinally, and if the shelf holds the product A laterally, then product A is stored laterally. This completes the loading operation for the product A.

To unload a product A, information relating to the product A to be unloaded is entered in the command device 47. Based on the entered information, the control device H selects the product holding shelf 1 and the product holding position at which the product A to be unloaded is stored.

The opposite of the loading operation described above is then performed. A stacker crane 2 unloads the product A from the selected product holding position of the product holding shelf and transfers the product A to the unloading lifter 8. Then, the unloading lifter 8 is lowered and the product A is transferred on to the unloading conveyor 7. If the unloading conveyor 7 is a perpendicular unloading conveyor 7a, the product transfer device 26 disposed at the terminal end causes the pushing section 36a of the sliding member 36 and the pushing member 40 to work together, as described above, so that the product A is unloaded to the unloading slat conveyor 6 at the same speed as the conveyance speed of the unloading slat conveyor 6.

More specifically, the transfer rollers 28 of the product transfer device 26 are rotated while the product A of the roller conveyor 25A is loaded and means for detecting load presence 46a detects this. Then, the air cylinder 41 is activated to switch the pushing member 40 to the projected position, and the rodless cylinder 37 is activated to displace the movable frame 38 toward the unloading slat conveyor 6. The pushing member 40, which is in the projected position, pushes the product A and forces it toward the unloading slat conveyor 6. Then, means for detecting load presence 46b, which is disposed at the exit side of the product transferring device 26, detects the product A, and, while the movable frame 38 is displaced, the electric threaded shaft motor 31 rotates the threaded shaft 30. This causes the sliding member 36 to move along the direction of conveyance of the unloading slat conveyor 6, and the pushing section 36a disposed on the sliding member 36 pushes the product A.

Thus, the combined actions of the sliding member 36 and the pushing member 40 causes the product A to cut diagonally across the transfer surface 28a. The product A is transferred to the unloading slat conveyor 6 at the same longitudinal speed as the conveyance speed of the slat conveyor 6. Once the transfer operation is completed, the electric threaded shaft motor 31 is operated in reverse so that the sliding member 36 returns to its original position. Also, the air cylinder 41 operates to return the pushing member 40 to its original retracted position.

If the unloading conveyor 7 is a diagonal unloading conveyor 7b, an appropriate rotation roller 23 is rotated to unload onto the unloading slat conveyor 6. Then, switching means 17, 18 of the unloading slat conveyor 6 act to unload the product A at an appropriate position, thus completing the unloading operation.

In the embodiment described above, a transfer conveyor 28A has a transfer surface 28a formed from the upper surfaces of the transfer rollers 28. However, it is within the scope of the invention to use a plate-shaped body on which the product A is mounted and to move the upper surface thereof to serve as the transfer surface.

Furthermore, if a transfer conveyor 28A is to be used, it does not have to be a roller-driven conveyor and can instead be a belt-driven conveyor. If a roller-driven conveyor is to be used, various variations would be possible, such as the use of freely rotating rollers.

Figure 17:
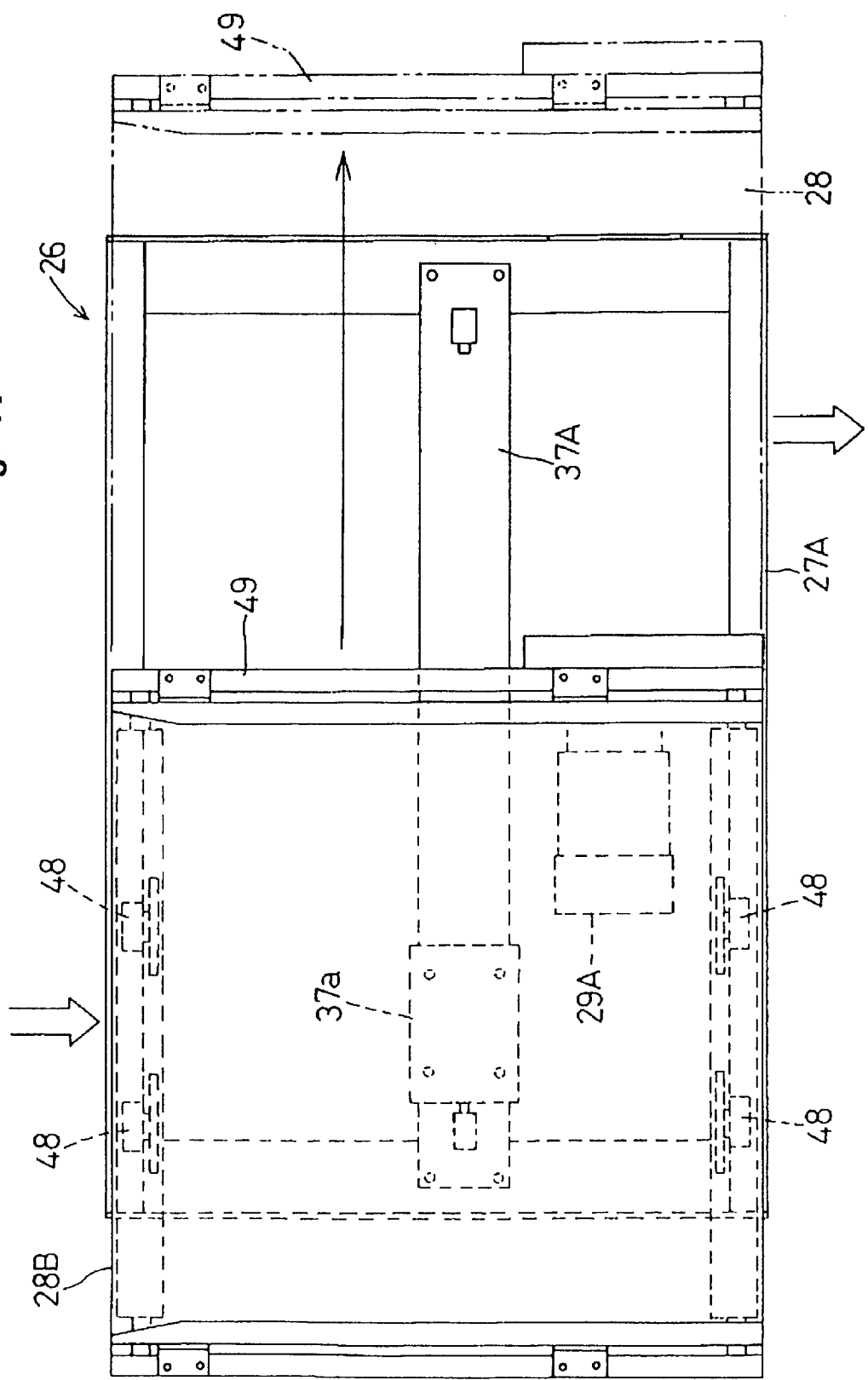
FIG. 17 is a plan drawing of an alternative embodiment of a product transferring device.
Figure 18:
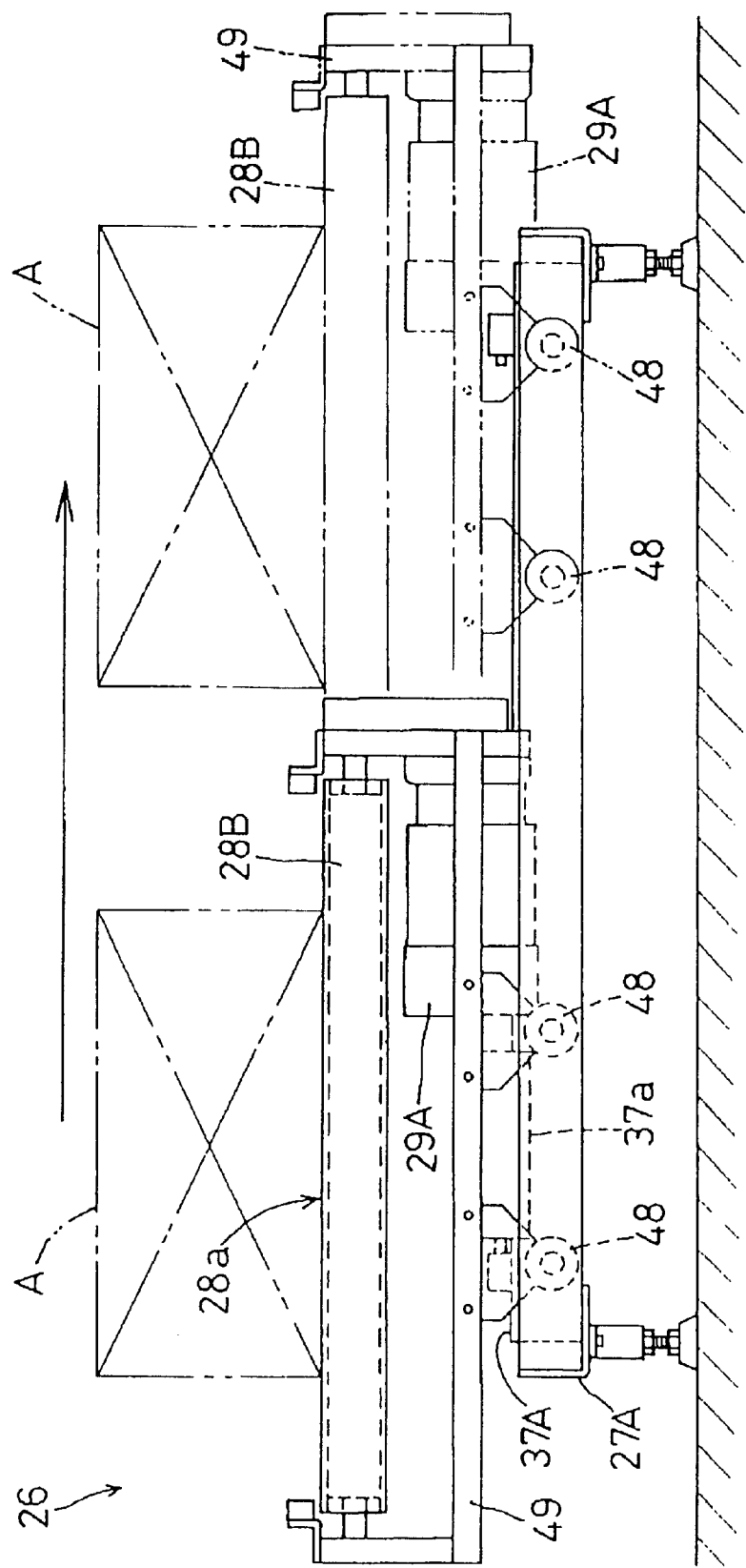
FIG. 18 is a front-view drawing of an alternative embodiment of a product transferring device.
Figure 19:
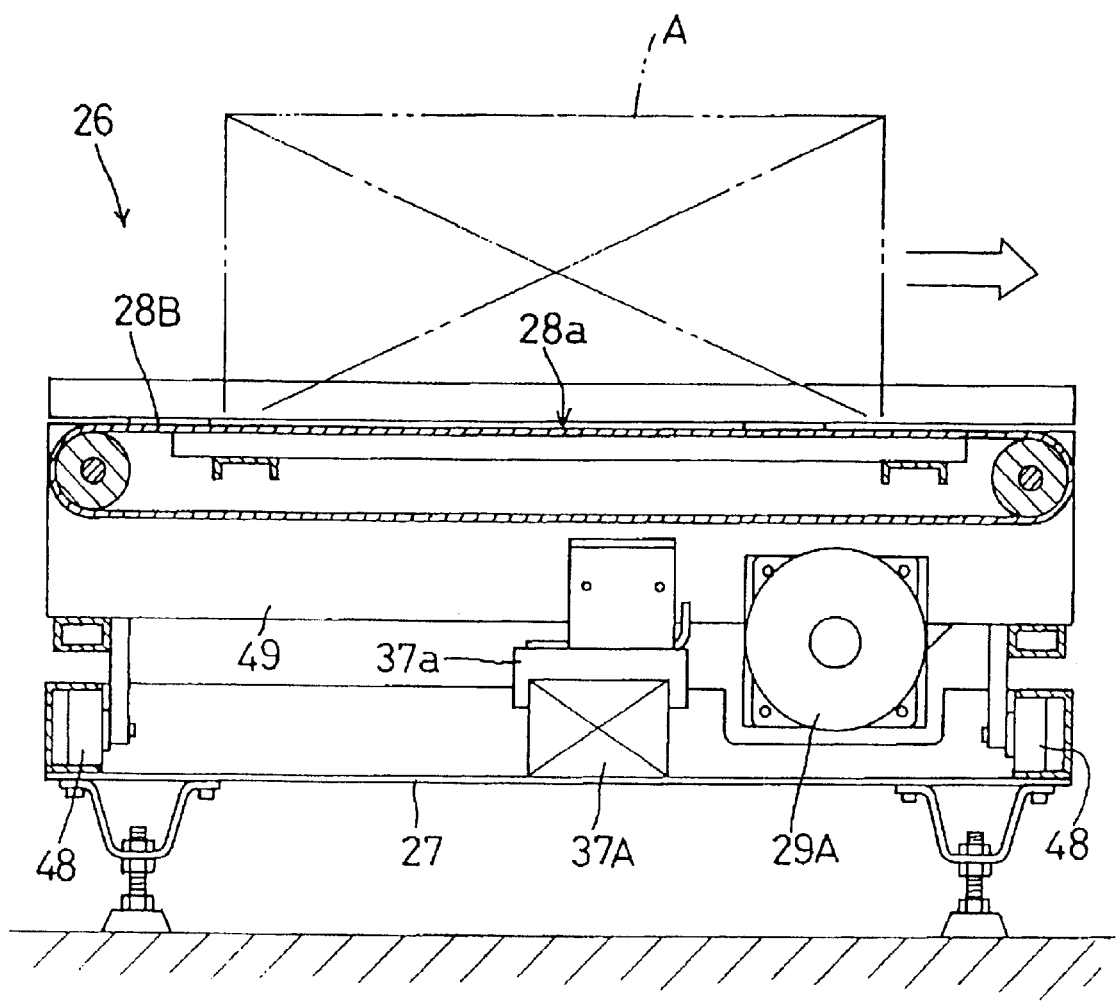
FIG. 19 is a side-view drawing of a vertical cross-section of an alternative embodiment of a product transferring device.

Referring to FIG. 17 through FIG. 19, there is shown another embodiment of the product transfer device 26. In this product transfer device 26, a frame 27A is formed in a roughly rectangular shape when seen from above. On the frame 27A a flat car 49 having wheels 48 is movably mounted to serve as means for conveying. An air-driven rodless cylinder 37A is attached to the frame 27A, extending along the direction of conveyance of the unloading slat conveyor 6. The flat car 49 is connected to a piston member 37a, which is linked to the piston of the rodless cylinder 37A. The activation of the rodless cylinder 37A causes the flat car 49 to move in reciprocating motion along the direction of conveyance of the unloading slat conveyor 6.

A belt-driven pushing conveyor 28B is attached to the flat car 49 to serve as means for unloading. An electric belt motor 29A attached to the frame 27A causes the pushing conveyor 28B to transfer the product A toward the unloading slat conveyor 6.

In this alternative embodiment, the upper surface of the belt of the pushing conveyor 28B forms the transfer surface 28a for transferring the product A onto the unloading slat conveyor 6. Also, the conveyance speed of the pushing conveyor 28B is set to be faster than the conveyance speed of the unloading slat conveyor 6. The pushing conveyor 28B unloads the product A onto the unloading slat conveyor 6.

In the product transferring device 26 of this alternative embodiment, the product A is loaded while the pushing conveyor 28B is being rotated. Means for detecting load presence (not shown in the figure) disposed on the product transferring device 26 detects the completion of the loading of the product A, and when this happens, the pushing conveyor 28B conveys the product A toward the unloading slat conveyor 6 while the rodless cylinder 37A is activated to move the flat car 49 in the conveyance direction of unloading slat conveyor 6.

As described above, the flat car 49 having a pushing conveyor 28B is moved in the conveyance direction of the unloading slat conveyor 6, and the product A on the pushing conveyor 28B is conveyed along the conveyance direction of the unloading slat conveyor 6. The pushing conveyor 28B conveys the product A toward the unloading slat conveyor 6 from a loading direction roughly perpendicular to the conveyance direction of the unloading slat conveyor 6. Thus, the product A is pushed on to the unloading slat conveyor. The speed of the flat car 49 in the direction of the unloading slat conveyor 6 is roughly the same as the conveyance speed of the unloading slat conveyor 6. Thus the product A is transferred in a synchronized manner with the conveyance speed of the unloading slat conveyor 6, without its orientation being changed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A product transferring device, in which a product is conveyed and mounted onto a moving conveyor from a side of said moving conveyor, comprising:

first means for conveying said product along a conveyance direction of said product transferring device;

said first means conveying said product at a speed substantially equal to a conveyance speed of said moving conveyor;

second means for conveying said product in a direction substantially perpendicular to said conveyance direction of said moving conveyor;

third means for conveying said product in a direction substantially perpendicular to said conveyance direction of said moving conveyor; and said first, second, and third means for conveying are operated simultaneously to transfer said product onto said moving conveyor without reorienting said product.

2. A product transferring device as recited in claim 1 wherein:

said first means for conveying includes a sliding member that is moved along said conveyance direction of said conveyor to push said product in said conveyance direction;

said second means for conveying includes a transfer conveyor that is moved perpendicularly to said conveyance direction; and said third means for conveying includes a pushing member that is moved perpendicular to said conveyance direction of said conveyor to push said product onto said conveyor.

3. A product transferring device as recited in claim 2 wherein:

said pushing member moves relative to said sliding member.

4. A product transferring device as recited in claim 3 further comprising:

said transfer conveyor disposed below said pushing member and said sliding member;

means for driving said sliding member to move said product in said conveyance direction;

a speed of said transfer conveyor being slower than a speed of said pushing member; and a product feeding section disposed toward a conveyance direction of said transfer conveyor for feeding a product to said transfer conveyor.

5. A product transferring device as recited in claim 2 further comprising:

said transfer conveyor disposed below said pushing member and said sliding member;

means for driving said sliding member to move said product in said conveyance direction;

a speed of said transfer conveyor being slower than a speed of said pushing member; and a product feeding section disposed toward a conveyance direction of said transfer conveyor for feeding a product to said transfer conveyor.

6. A product transferring device as in claim 2, wherein:

said sliding member contacting a first side of said product;

said transfer conveyor contacting a second side of said product orthogonal to said first side; and said pushing member contacting a third side of said product orthogonal to said first and second sides, whereby said product is transferred to said moving conveyor without reorientation.

7. A product transferring device as recited in claim 1 wherein:

said first means for conveying includes a flat car moving along said conveyance direction of said conveyor;

said second means for conveying includes a pushing conveyor disposed on said flat car; and said second means for conveying including means for pushing said product onto said conveyor with a conveyance speed of said pushing conveyor being faster than a conveyance speed of said conveyor.

8. A product transferring device for loading a product from a feeding conveyor onto a moving unloading conveyor, comprising:

a first conveying device;

said first conveying device including first means for moving said product in a conveying direction of said moving unloading conveyor;

a second conveying device;

said second conveying device including second means for moving said product in a second direction substantially perpendicular to said conveying direction of said moving conveyor;

a third conveying device;

said third conveying device including a third means for moving said product in said second direction perpendicular to said conveying direction of said moving unloading conveyor; and a simultaneous operation of said first, second, and third conveying devices being effective for moving said individual product in a diagonal path from said feeding conveyor onto said moving unloading conveyor without reorienting said product.

9. A product transferring device according to claim 8, wherein:

said first conveying device includes a pushing member for pushing said product in said conveying direction;

said pushing member contacting said product on a first product side to push and prevent rotation of said product; and said pushing member pushing said product at a speed equal to a speed of said moving unloading conveyor.

10. A product transferring device according to claim 9, wherein:

said second conveying device includes a second pushing member movable in said second direction relative to said first conveying device;

said second pushing member contacting said product on a second product side to move and prevent rotation of said product, said second product side orthogonal to said first product side; and said second pushing member moving said product in said second direction at a speed slower than said unloading conveyor.

11. A product transferring device according to claim 10, wherein:

said third conveying device includes a plurality of rolling members;

said rolling members contacting said product on a third product side to move and prevent rotation of said product;

said third product side orthogonal to both said first and second product sides; and said rolling members rolling said product in said second direction orthogonal to said conveying direction.

12. A product transferring device according to claim 10, wherein:

said third conveying device includes a movable surface;

said movable surface contacting said product on a third product side to move and prevent rotation of said product;

said third product side orthogonal to both said first and second product sides; and said movable surface moving said product in said second direction orthogonal to said conveying direction.

13. A product transferring device according to claim 8, wherein:

said third conveying device moves in said second direction at a speed greater than said speed of said moving unloading conveyor, whereby said product is transferred to said moving unloading conveyor without disturbing its orientation relative to said first or second conveying device or said conveyance direction.

14. A product transferring device according to claim 8, wherein:

said first conveying device includes a movable surface onto which said product is moved;

said movable surface being movable in said conveying direction of said moving conveyor; and said second conveying device includes a pushing device movable with respect to said movable surface.

15. A product transferring device according to claim 8, wherein:

said first conveying device moves in said conveying direction of said moving conveyor at a speed substantially equal to a speed of said moving unloading conveyor, whereby said product is transferred to said moving unloading conveyor without disturbing its orientation relative to said conveyance direction.

16. A product transferring device according to claim 8, wherein:

said second conveying device moves in said second direction at a speed less than said speed of said moving unloading conveyor, whereby said product is transferred to said moving unloading conveyor without disturbing its orientation relative to said conveyance direction.

* * * * *